(12) United States Patent
Schlitzkus et al.

(10) Patent No.: US 10,998,798 B2
(45) Date of Patent: May 4, 2021

(54) DRIVE ASSEMBLY, IN PARTICULAR HYDRAULIC ASSEMBLY OF AN ELECTRONICALLY SLIP-CONTROLLABLE VEHICLE BRAKE SYSTEM

(71) Applicant: Robert Bosch GmbH, Stuttgart (DE)

(72) Inventors: Michael Schlitzkus, Dietmannsried (DE); Anna Wondrak, Altusried (DE); Helmut Seiband, Bobingen (DE); Stefan Lehenberger, Weitnau (DE); Thomas Zander, Oberstaufen (DE); Valentin Notemann, Sonthofen (DE)

(73) Assignee: Robert Bosch GmbH, Stuttgart (DE)

( * ) Notice: Subject to any disclaimer, the term of this patent is extended or adjusted under 35 U.S.C. 154(b) by 313 days.

(21) Appl. No.: 16/160,585

(22) Filed: Oct. 15, 2018

(65) Prior Publication Data

US 2019/0140523 A1    May 9, 2019

(30) Foreign Application Priority Data

Oct. 19, 2017    (DE) .................... 10 2017 218 648.8

(51) Int. Cl.
*H02K 11/01* (2016.01)
*H02K 11/21* (2016.01)
(Continued)

(52) U.S. Cl.
CPC ........ *H02K 11/0141* (2020.08); *B60T 13/662* (2013.01); *B60T 13/745* (2013.01);
(Continued)

(58) Field of Classification Search
CPC .... H02K 11/33; H02K 11/0141; H02K 11/21; H02K 7/102; B60T 8/176
(Continued)

(56) References Cited

U.S. PATENT DOCUMENTS 8,975,793 B2 * 3/2015 Palfenier .................. H02K 1/00
310/68 B
9,041,259 B2 * 5/2015 Palfenier .................. H02K 5/20
310/43

(Continued)

FOREIGN PATENT DOCUMENTS

| CN | 105720747 A | 6/2016 |
|---|---|---|
| CN | 105932830 A | 9/2016 |
| DE | 10 2014 221 015 A1 | 4/2016 |

*Primary Examiner* — Jeremy A Luks
(74) *Attorney, Agent, or Firm* — Maginot, Moore & Beck LLP

(57) ABSTRACT

A drive assembly has a housing block, on which there is arranged an electrical machine. The latter has a working shaft mounted in a shaft bore of the housing block and the rotational position of which is detected by a sensor device formed by a signal transmitter and a signal receiver comprising evaluation electronics. The shaft bore is closed by a cover, which is arranged between signal transmitter and signal receiver. The cover is formed in one piece with an electronics housing of the signal receiver. A centering device for the signal receiver is formed on the housing block on the electronics housing. The disclosed drive assembly simplifies the construction, functional testing and mounting of the signal receiver and at the same time improves the protection thereof against damaging environmental influences.

9 Claims, 2 Drawing Sheets

(51) Int. Cl.

| | |
|---|---|
| *H02K 7/102* | (2006.01) |
| *B60T 8/176* | (2006.01) |
| *B60T 13/74* | (2006.01) |
| *B60T 13/66* | (2006.01) |
| *H02K 11/215* | (2016.01) |
| *H02K 7/00* | (2006.01) |

(52) U.S. Cl.
CPC ............. *H02K 7/003* (2013.01); *H02K 7/102* (2013.01); *H02K 11/21* (2016.01); *H02K 11/215* (2016.01); *B60T 8/176* (2013.01); *H02K 2211/03* (2013.01)

(58) Field of Classification Search
USPC ........................................................ 310/68 B
See application file for complete search history.

(56) References Cited

U.S. PATENT DOCUMENTS

| | | | |
|---|---|---|---|
| 9,764,725 B2* | 9/2017 | Lutz | H02K 5/22 |
| 10,160,276 B2* | 12/2018 | Tucker | B60G 13/14 |
| 2002/0117914 A1* | 8/2002 | Doi | H02K 29/08 |
| | | | 310/68 R |
| 2012/0229005 A1* | 9/2012 | Tominaga | H02K 11/38 |
| | | | 310/68 B |
| 2013/0300222 A1* | 11/2013 | Nakano | H02K 3/50 |
| | | | 310/43 |
| 2014/0125173 A1* | 5/2014 | Hayashi | H02K 3/522 |
| | | | 310/88 |
| 2016/0181885 A1* | 6/2016 | Yamasaki | B62D 5/0403 |
| | | | 180/443 |
| 2018/0269751 A1* | 9/2018 | Foerch | F04B 49/06 |
| 2019/0376511 A1* | 12/2019 | Kobayashi | F04C 29/047 |

* cited by examiner though all the way through. Therefore, the exemplary bore like a blind bore is

DRIVE ASSEMBLY, IN PARTICULAR HYDRAULIC ASSEMBLY OF AN ELECTRONICALLY SLIP-CONTROLLABLE VEHICLE BRAKE SYSTEM

This application claims priority under 35 U.S.C. § 119 to patent application Ser. No. DE 10 2017 218 648.8, filed on Oct. 19, 2017 in Germany, the disclosure of which is incorporated herein by reference in its entirety.

BACKGROUND

The disclosure relates to a drive assembly, in particular a hydraulic drive assembly of an electronically slip-controllable vehicle brake system.

A drive assembly of this type is already known, for example from DE 10 2014 221 015 A1. In particular, this known drive assembly is a hydraulic assembly of an electronically slip-controllable vehicle brake system. However, the disclosure is not restricted to such hydraulic assemblies but instead can be applied to any desired drive assemblies which are equipped with a motor or generator, for short an electric machine, and in which a rotational position of a working shaft is detected and/or evaluated with the aid of a sensor device. Known sensor devices have a signal transmitter and a signal receiver with associated evaluation electronics for this purpose.

In a drive assembly 10 known to the applicant and shown in FIG. 1, the signal transmitter 22 is arranged by means of a holding device 24 on one of the front ends of a working shaft 16 and revolves with this working shaft 16. A signal receiver 26, composed of a circuit board 32, a sensor IC 34 and evaluation electronics 38 formed on the circuit board 32, is fixed to a housing block 12 opposite the signal transmitter 22. For this purpose, conventional fixing means arranged on the circumference of the signal receiver 26 are used. In order to protect the evaluation electronics 38, the circuit board 32 and the sensor IC 34 against external damage and against undesired environmental influences, these are accommodated in the interior of an electronics housing 50 that is open toward the signal transmitter 22. A cover 40 pressed into the shaft bore 14 closes the shaft bore 14 toward the interior of said electronics housing 50. The cover 40 is formed in the shape of a cup, encloses the signal transmitter 22 circumferentially and, before the signal receiver 26 is anchored on the housing block 12, is anchored in the shaft bore 14 in a dedicated operation, preferably pressed in.

In addition to reliable separation of the electronics housing from the shaft bore, for the most precise detection possible of the rotational position of the working shaft, it is important that the signal transmitter and the signal receiver are aligned with each other and are arranged in the axial extension of the working shaft. Such an axially and radially aligned mounting of these components is demanding in terms of manufacture and often results in subsequent outlay on inspection and testing.

SUMMARY

By contrast, a drive assembly according to the features disclosed herein has the advantage that the signal transmitter can be received directly in the motor mounting bore and can be fixed to the housing block via said engine mounting bore. This fixing of the signal receiver to the housing block ensures particularly accurate axial and radial alignment of the signal receiver relative to the signal transmitter and the motor shaft and avoids separate fixing means, which in turn saves parts and mounting space in the surroundings of the signal receiver. A cover to be mounted separately in order to close the shaft bore toward the electronics housing of the signal receiver is dispensed with and therefore associated mounting steps relating to anchoring this cover on the housing block are saved, without dispensing with its protective function.

According to the disclosure, the cover is formed in one piece with the electronics housing, which avoids separating joints and therefore possibly associated leaks between the two components. The signal receiver and the evaluation electronics making contact therewith are received in a better protected manner as a result in an installation space of the electronics housing that is closed toward the surroundings. Furthermore, the disclosure permits rotational position-oriented anchoring of the signal receiver on the housing block, which reduces the outlay relating to subsequent calibration of the sensor device. Furthermore, a signal receiver according to the disclosure now forms an intrinsically closed component, which can be checked for its serviceability before it is fixed to the housing block.

Further advantages or advantageous developments of the disclosure can be gathered from the following description.

A shielding sleeve creates the possibility of shielding the sensor device with respect to possible irradiation by interference signals, in particular electromagnetic waves, and of leading possibly damaging voltage pulses away from the signal receiver.

BRIEF DESCRIPTION OF THE DRAWINGS

An exemplary embodiment of the disclosure is illustrated in the drawing and will be explained in detail in the following description.

Both figures show the respective devices in longitudinal section.

DETAILED DESCRIPTION

Figure 1:
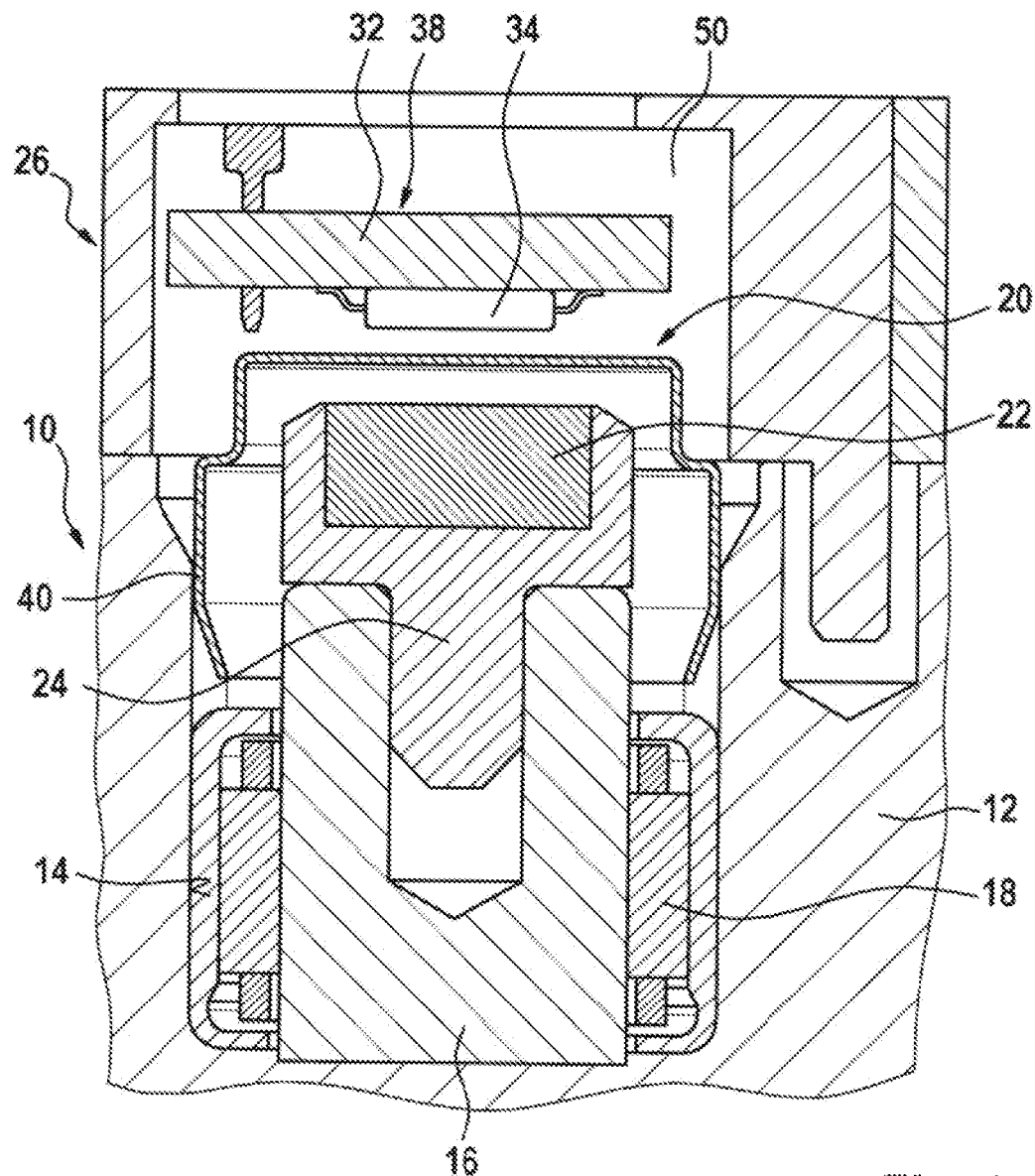
FIG. 1 shows the prior art known to the applicant and already explained at the beginning.
Figure 2:
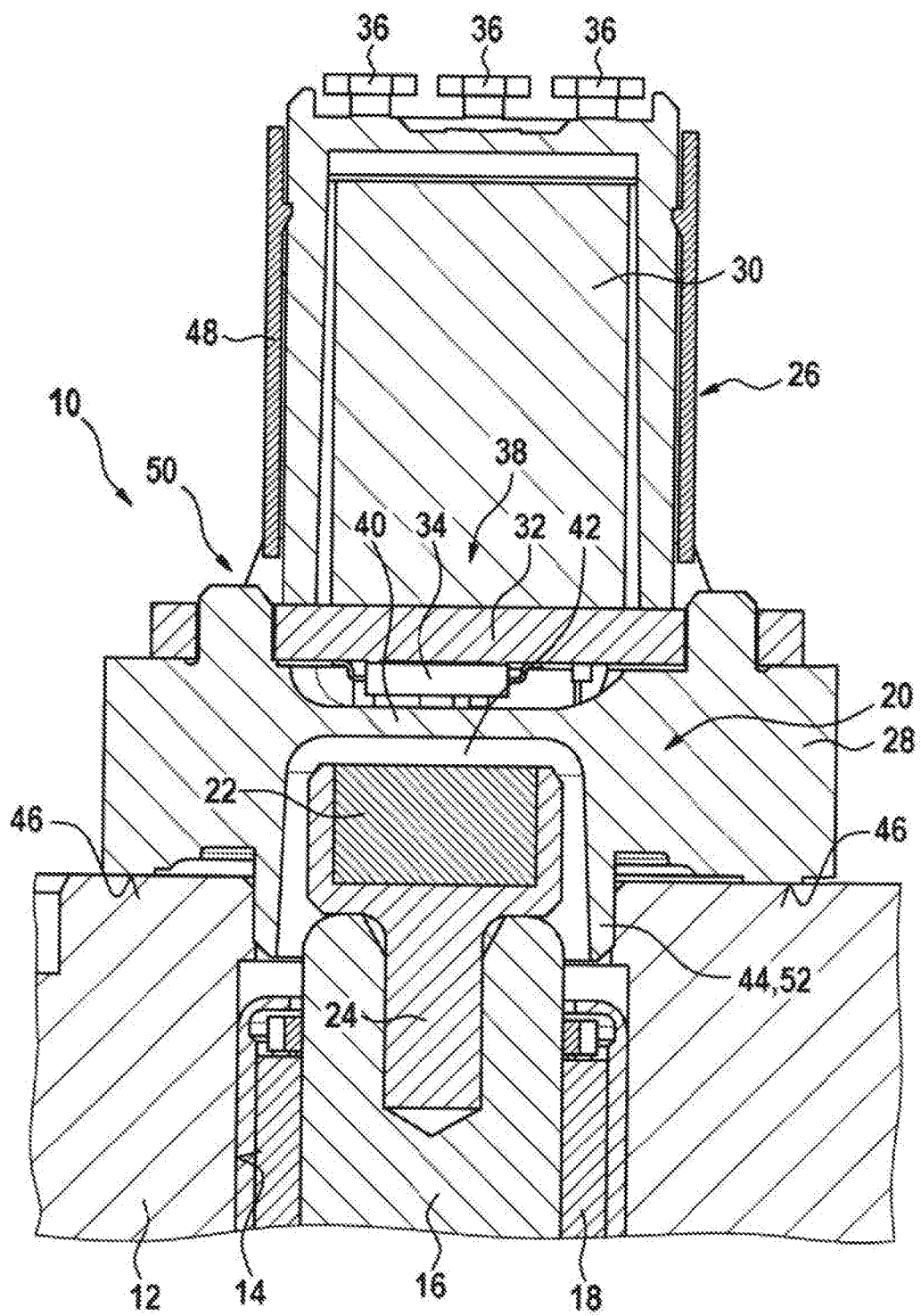
FIG. 2 shows a detail of a drive assembly according to the disclosure.

The drive assembly 10 illustrated in FIG. 2 comprises a housing block 12 with a shaft bore 14 formed thereon. The latter passes through the housing block 12 and, on mutually opposite outer sides of the housing block 12, forms two open ends, of which only one can be seen in the figure. A working shaft 16 is rotatably received in the shaft bore 14 in shaft bearings 18. This working shaft 16 is part of a motor or of a generator, for short an electric drive machine, which is provided to convert supplied electric energy into a rotational movement of the working shaft 16 or a rotational movement of the working shaft 16 into electric energy. It should be assumed that a rotor, which cannot be seen and which rotates in a stator likewise not illustrated and fitted with magnets, is rotationally fixedly arranged on the working shaft 16.

For the electronic activation of the drive machine, knowledge of the rotational position of the working shaft 16 is important. This rotational position is determined by means of a sensor device 20 and, if appropriate, forwarded to an electronic control device.

For this purpose, the sensor device 20 comprises a signal transmitter 22, in particular a magnet, which is fixed to the rotating working shaft 16 by means of a suitable holding device 24 and revolves with said working shaft 16. In the exemplary embodiment, a receiving bore like a blind bore is formed for example in the center of the working shaft 16, into which bore the holding device 24 carrying the magnet is pressed with a centrally projecting fixing pin.

The sensor device 20 also comprises a signal receiver 26, which is firmly anchored to the housing block 12. Said signal receiver 26 has an electronics housing 50 made of a circuit carrier 28 facing the housing block 12 and a contact piece 30 connected to the circuit carrier 28. Arranged on the circuit carrier 28 is a circuit board 32 fitted with a sensor IC 34 and with evaluation electronics 38. The contact piece 30 has electrically conducting contacts 36, via which the evaluation electronics 38 communicate with external electronic equipment.

The sensor IC 34 is located opposite and in alignment with the signal transmitter 22 and detects a magnetic field from the signal transmitter 22, changing periodically with a revolution of the working shaft 16. From a recorded signal profile, the evaluation electronics 38 are able to determine the rotational speed and the rotational position of the working shaft 16 in space.

Between the signal transmitter 22 and the signal receiver 26 there is a cover 40, which interrupts a connection of the shaft bore 14 to an installation space of the evaluation electronics 38. Said cover 40 is formed in one piece with the circuit carrier 28 of the electronics housing 50 and forms the closed end of a recess 42 that is open toward the outside, which recess is formed on a side of the circuit carrier 28 that faces the housing block 12. A collar 44, designed for example as a closed annular collar, projects perpendicularly from the circuit carrier 28 in the axial extension of the recess 42 in the direction of the housing block 12. This collar 44 forms a centering device 52 for the signal receiver 26 on the housing block 12, in that its outer diameter is matched dimensionally to the inner diameter of the shaft bore 14. Between the collar 44 and a wall surrounding the shaft bore 14, it is possible for a force-/form-fitting connection to be formed, via which the signal receiver 26 can be fixed to the housing block 12 so as to be centered relative to the signal transmitter 22. The collar 44 is at least partly surrounded by a radially extending flange section 46 of the circuit carrier 28. With this flange section 46, at least some regions of the circuit carrier 28 of the electronics housing 50 rest on the housing block 12.

When the signal receiver 26 is mounted, the collar 44 of the circuit carrier 28 encloses the signal transmitter 22 fixed to the working shaft 16 circumferentially with a radial spacing. The evaluation electronics 38, circuit board 32 and sensor IC 34 are arranged so as to be separated physically from the shaft bore 14 by this configuration, so that potential contaminants penetrating through this shaft bore 14 cannot reach the evaluation electronics 38 or the sensor IC 34 and disrupt their function.

As mentioned, the contact piece 30 is connected to the evaluation electronics 38 on the circuit carrier 28. At its end remote from the circuit carrier 28, this contact piece 30 is fitted with electrically conducting contacts 36, via which the signals from the sensor device 20 evaluated by the evaluation electronics 38 can be forwarded, for example to an external electronic control device. The contact piece 30 has, by way of example, a cube-shaped cross section. A shielding sleeve 48 made of electrically conductive and magnetically nonconductive material, in particular stainless steel, encloses the contact piece 30 along its circumference. Via this shielding sleeve 48, voltage peaks that occur can be led away from the sensor device 20 and electromagnetic irradiation from outside can be prevented.

Of course, changes or advantageous developments to the exemplary embodiment described are conceivable without departing from the basic idea of the disclosure.

What is claimed is:

1. A drive assembly, comprising:
   a housing block including a shaft bore;
   an electric machine arranged on the housing block, the electric machine having a working shaft rotatably mounted in the shaft bore;
   a sensor device configured to detect a rotational position of the working shaft, the sensor device comprising (i) a signal transmitter mounted on the working shaft, and (ii) a signal receiver and evaluation electronics mounted on a circuit board; and
   a circuit carrier configured to close the shaft bore, the circuit board mounted on the circuit carrier,
   wherein the circuit carrier includes a cover located between the signal transmitter and the signal receiver, the cover configured to cover the shaft bore,
   wherein the circuit carrier includes a collar at least partially projecting into the shaft bore and configured as a centering device configured to center the signal receiver relative to the signal transmitter, and
   wherein the circuit carrier is configured to isolate electrically the circuit board from the electric machine.

2. The drive assembly according to claim 1, wherein the collar is configured to rest on a wall surrounding the shaft bore.

3. The drive assembly according to claim 2, wherein the collar is an annular collar, which encloses a recess which, at one of its ends, is closed by the cover.

4. The drive assembly according to claim 2, wherein there is at least one of a force-fitting and a form-fitting connection between the collar and the wall surrounding the shaft bore.

5. The drive assembly according to claim 1, further comprising:
   an electronics housing mounted on the circuit carrier configured to house at least a portion of the circuit board.

6. The drive assembly according to claim 5, further comprising:
   a contact piece operably connected to the circuit board and located within the electronics housing.

7. The drive assembly according to claim 1, wherein the drive assembly is a hydraulic drive assembly of an electronically slip-controllable vehicle brake system.

8. The drive assembly according to claim 6, further comprising:
   a shielding sleeve configured to enclose a circumference of the contact piece.

9. The drive assembly according to claim 8, wherein the shielding sleeve is formed from electrically conductive and magnetically nonconductive material.

* * * * *

UNITED STATES PATENT AND TRADEMARK OFFICE
CERTIFICATE OF CORRECTION

PATENT NO. : 10,998,798 B2
APPLICATION NO. : 16/160585
DATED : May 4, 2021
INVENTOR(S) : Schlitzkus et al.

Page 1 of 1

It is certified that error appears in the above-identified patent and that said Letters Patent is hereby corrected as shown below:

In the Claims

In Claim 5, at Column 4, Lines 43-44: "the circuit carrier configured" should read --the circuit carrier and configured--.

Signed and Sealed this
Third Day of August, 2021

Drew Hirshfeld
*Performing the Functions and Duties of the*
*Under Secretary of Commerce for Intellectual Property and*
*Director of the United States Patent and Trademark Office*